3,428,666
PROCESS FOR THE STABILIZATION OF ACRYLONITRILE
Paul Schneider, Opladen, Germany, and Bernhard Scherhag, Leverkusen, Germany, assignors to Farbenfabriken Bayer Aktiengesellschaft, Leverkusen, Germany, a corporation of Germany
No Drawing. Filed Feb. 16, 1966, Ser. No. 527,722
Claims priority, application Germany, Mar. 6, 1965,
F 45,438
U.S. Cl. 260—465     6 Claims
Int. Cl. C07c *121/66, 121/28*

ABSTRACT OF THE DISCLOSURE

A process for stabilizing acrylonitrile which comprises admixing acrylonitrile with a substituted aminodiphenylamine having the formula:

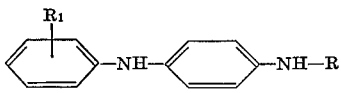

wherein R is aryl, aralkyl, cycloalkyl or alkyl ($C_{1-8}$) and $R_1$ is hydrogen or alkyl ($C_{1-2}$).

---

This invention relates to a process for stabilizing acrylonitrile.

It is known that acrylonitrile and its substitution derivatives, for example α-methylacrylonitrile, α-cyanacrylonitrile and α-phenylacrylonitrile, can be polymerized very easily with free radical forming compounds to give polymers of high molecular weight. When the polymerization is controlled, substances are obtained with physical properties which have found a wide industrial application. Examples are acrylonitrile fibres, oil-resistant rubbers or impact-resistant thermoplastics. In order to be able to manufacture these substances, the acrylonitrile used must be of extremely high purity. However, when the monomer is purified or converted chemically to amides or to esters, the acrylonitrile and its substitution products can very easily experience an undesirable polymerization. This in turn can cause a disturbance in the steps involved in the purification or conversion or can entirely jeopardize these latter. Furthermore, it is known that α,β-unsaturated nitriles are able to polymerize during storage and thereby become useless for further processing purposes.

In searching for suitable polymerization inhibitors, a number of substances have been discovered which can effect a certain retardation or even a prevention of the polymerization under certain conditions, but under other conditions they have only a slight or even no inhibiting effect. For example, inorganic compounds show only a slight effect in an acid pH range and they must be removed before polymerizing the acrylonitrile. On the other hand, other inhibitors show a discoloration of the stabilized material. Yet again, further inhibitors exist which do not cause a discoloring effect, but they usually have to be used in such a concentration that, if they are left in the monomer, they influence the required polymerization unfavorable or are deposited, for example, in purification processes by distillation, as tough, cheese-like residues on the walls of the apparatus and interfere with the running operations. A perfect stabilizer should consequently be effective in very small concentration under extreme conditions, but on the other hand, they should no longer in this concentration influence a subsequent and intended polymerization.

We have now found inhibitors which enable acrylonitrile and its substitution derivatives to be stabilized against an unintended polymerization under extreme conditions.

The present invention provides a process for stabilizing acrylonitrile or substitution derivatives thereof against undesired polymerization, which comprises admixing the acrylonitrile or a substitution derivative thereof with a substituted aminodiphenylamine of the general formula

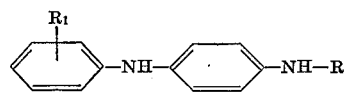

in which R represents an aryl, aralkyl, cycloalkyl or alkyl radical containing up to 8 carbon atoms and $R_1$ represents hydrogen or an alkyl radical with 1 or 2 carbon atoms.

Typical examples of this class of compounds are for example 4-phenylaminodiphenylamine,
N,N'-di-o-tolyl phenylene diamine,
dixylidyl-p-phenylene diamine,
benzylamino diphenyl amine,
4-cyclohexylaminodiphenylamine,
4-(α-methyl)-cyclohexylaminodiphenylamine,
4-methylaminodiphenylamine,
3-isopropylamino-diphenylamine,
4-(1-methyl)-propylaminodiphenylamine,
4-(1,2-dimethyl)-propylaminodiphenylamine,
4-(1-methyl)-butylaminodiphenylamine,
4-(1,3-dimethyl)-butylaminodiphenylamine or
octylaminodiphenylamine or
4-isopropylamino-4'-methyl diphenylamine.

The quantity of the compounds of the above general formula which is most desirable for inhibiting the polymerization can easily be established by a test. Generally speaking, depending on the material to be stabilized and on the treatments awaiting the material, 0.1 to 1000 parts by weight, advantageously 0.1 to 100 parts by weight, of the compounds according to the invention, are used per 1,000,000 parts by weight of acrylonitrile or its substitution products, such as α-methacrylonitrile, α-cyanacrylonitrile or α-phenylacrylonitrile.

The compounds of the above general formula can be used in all cases where acrylonitrile and/or its substitution products are prepared, purified, stored or modified. By "modification," there is to be understood for example the saponification with simultaneous esterification to methyl, butyl, cyclohexyl or ethyl acrylates, the saponification to acrylic acid, the saponification of acetone cyanohydrin in the presence of methanol to methyl methacrylate, the splitting of water from acetophenone cyanohydrin to form α-phenylacrylonitrile or the cyanethylation with acrylonitrile.

The following examples illustrate the invention:

In these examples, the term "acrylonitrile A" designates an acrylonitrile which has been obtained by one of the conventional processes from acetylene and hydrocyanic acid, while the product designates as "acrylonitrile P" has been obtained by one of the known processes from propylene, ammonia and oxygen in the presence of an oxidation catalyst.

EXAMPLE 1

Oxygen bomb tests are generally used as a method of testing the stability of acrylonitrile in storage, for example tests described according to ASTM D525–55 for the testing of the stability of fuels. In this test, the acrylonitrile is subjected in a bomb fitted with a removable glass insert having a capacity of about 25 ml. and at an oxygen pressure of 8 atmospheres to a temperature of 100° C. The bomb is connected to a printing recorder. A sudden rise in pressure occurs on initiation of the polymerization of the acrylonitrile. The time which elapses until this happens is referred to as the induction period.

With a short induction period, the stability is low, while with a long induction period, the stability is greater. The following procedure was used in the present case.

Acrylonitrile in a quality suitable for the manufacture of fibres was subjected to the oxygen bomb test. The efficacy of the inhibitors according to the invention depended on their concentration and on the origin of the acrylonitrile being tested in the presence of stainless steel ("VA-steel"). p-Methoxyphenol was used for comparison purposes.

The sample to which the inhibitor was added was introduced into the glass vessel of the testing apparatus and a metal strip (area 1 x 6 cm.), by which the influence of the storage vessel was to be tested, was introduced. The bomb was closed and then set at 100° C. by means of a thermostat. The pressure curve was recorded over a maximum period of 6 hours. The commencement of polymerization was indicated by the sudden rise in pressure.

In the following Table 1:

A represents acrylonitrile A stabilized with methoxyphenol.
B represents acrylonitrile A stabilized with 4-isopropylaminodiphenylamine.
C represents acrylonitrile P stabilized with p-methoxyphenol.
D represents acrylonitrile P stabilized with 4-isopropylaminodiphenylamine.
E represents acrylonitrile P stabilized with 4-cyclohexylaminodiphenylamine.
F represents acrylonitrile P stabilized with 4-phenylaminodiphenylamine.
G represents acrylonitrile P stabilized with 4-(1,3-dimethyl)-butylaminodiphenylamine.

TABLE 1

| Inhibitor concentration in p.p.m. | Induction time in minutes | | | | | | |
|---|---|---|---|---|---|---|---|
| | A | B | C | D | E | F | G |
| 1 | 40 | 165 | 80 | 240 | 260 | 230 | 240 |
| 5 | -------- | >360 | 80 | >360 | >360 | >360 | >300 |
| 10 | -------- | >360 | 85 | >360 | -------- | -------- | -------- |
| 20 | -------- | >360 | 100 | >360 | >360 | >360 | >360 |
| 30 | 115 | | | | | | |
| 40 | -------- | -------- | 290 | -------- | | | |
| 60 | 310 | | | | | | |
| 80 | >360 | -------- | >360 | | | | |

EXAMPLE 2

As a test method for the stability with distillation, acrylonitrile containing various impurities was boiled at normal pressure under reflux and under different purification conditions and the time until the first clouding occurred was established. In addition, tests on a technical scale were carried out, by adding different inhibitors to the acrylonitrile to be purified in a distillation plant and by taking as standard for the efficiency the time for the formation of a polymeric coating which reduced the heat transfer in the cyclic vaporizers.

A highly contaminated acrylonitrile, containing 0.3% of water, 0.2% of methylvinyl ketone, 0.01% of divinyl acetylene, 0.008% of cyanobutadiene, 0.1% of hydrocyanic acid and also small quantities of peroxides, was to be purified by adding 0.4 part by weight of dodecyl mercaptan and 0.4 part by weight of p-toluosulphonic acid per 100 parts by weight of acrylonitrile, heating for 4 hours under reflux and subsequent two-stage distillation (see German patent specification No. 1,089,750). On adding the dodecyl mercaptan and the p-toluosulphonic acid, there was an immediate clouding in the cold, and this was intensified on heating and the mixture was completely polymerized. The addition of known polymerization inhibitors, such as hydroquinone, p-methoxyphenol, pyrocatechol, cyclohexyl pyrocatechol, in quantities up to 0.1 part by weight per 100 parts by weight of acrylonitrile, certainly prevent flocculation of polymer in the cold, but allow the mixture to polymerize into a viscous mass on heating. However, when only 0.005 part by weight of 4-isopropylaminodiphenylamine was added per 100 parts by weight of acrylonitrile, there was no longer any polymerization on heating.

EXAMPLE 3

Dodecyl mercaptan and p-toluosulphonic acid were added to an impure acrylonitrile having the composition indicated in Example 2 under the same conditions and, with and hourly throughput of 600 kg., stabilization was effected within each case 400 p.p.m. of hydroquinone, pyrocatechol and p-methoxy-2,6-di-tert.-butylphenol, and subjected to a two-stage continuous distillation. After 24 hours in each case, the installation had to be stopped, since the circulation vaporizers had polymerized. When, instead, 0.005 part by weight of 4-isopropylaminodiphenylamine was added per 100 parts by weight of acrylonitrile, the plant could be operated for a month without interruption.

EXAMPLE 4

700 ml. of distilled water were acidified with dilute sulphuric acid to pH 2.5 heated to 60° C. and nitrogen was bubbled therethrough for 10 minutes. Within 5 hours, the following solutions were simultaneously added dropwise from three dropping funnels:

(1) 0.6 g. of $K_2S_2O_8$, dissolved in 20 ml. of water,
(2) 0.3 g. of $Na_2S_2O_5$, dissolved in 20 ml. of water,
(3) 1000.0 g. of pure acrylonitrile.

10 to 20 seconds after starting the addition, the polymerization commended with clouding. After adding the said solutions, (1) 0.2 g. of $K_2S_2O_8$, dissolved in 10 ml. of water, and
(2) 0.1 g. of $Na_2S_2O_5$, dissolved in 10 ml. of water, were supplied from two dropping funnels. While passing nitrogen over, stirring was continued overnight at 60° C. After cooling to 20° C., the polymer was filtered off with suction, washed with water and dried at 60° C. in a vacuum drying chamber. The test was carried out concurrently with an acrylonitrile which was stabilized. The following results were obtained.

Yields of polymer:

(a) Unstabilized acrylonitrile=93.0 g.
(b) Stabilized with 5 p.p.m. of 4-isopropylaminodiphenylamine=92.0 g.

The polymers (a) and (b) in powder form and the concentrated solutions thereof in dimethyl formamide also did not show any change in color after exposure to light.

As is to be seen from Examples 1 to 3, the compounds used according to the inventions show a very good effect. Consequently, they make it possible for acrylonitrile to be stored, purified or reacted under extreme conditions. Since a minimum stability of 4 or 6 hours' induction period in the oxygen test is required for the storage of pure acrylonitrile, for which (according to Example 1) a quantity of only 1 to 5 parts by weight per million parts by weight of acrylonitrile is required of the inhibitors according to the invention, the possibility thus exists of polyacrylonitrile for the production of fibres to be produced by polymerization without previous removal of the inhibitors.

What we claim is:

1. A process for stabilizing a member selected from the group consisting of acrylonitrile, α-methylacrylonitrile, α-cyanacrylonitrile and α-phenylacrylonitrile against undesired polymerization which comprises admixing said acrylonitrile group member with 0.1 to 1000 parts by weight per 1M parts by weight of said acrylonitrile group member of a substituted aminodiphenylamine having the formula:

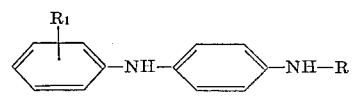

wherein R represents aryl, aralkyl, cycloalkyl or alkyl containing up to 8 carbon atoms and $R_1$ represents hydrogen or alkyl containing 1 to 2 carbon atoms as stabilizer.

2. A process according to claim 1 wherein said stabilizer is 4-isopropylaminodiphenylamine.

3. A process according to claim 1 wherein said stabilizer is 4-cyclohexylaminodiphenylamine.

4. A process according to claim 1 wherein said stabilizer is 4-(1,3-dimethyl)-butylaminodiphenylamine.

5. A process according to claim 1 wherein said stabilizer is used in an amount of 0.1 to 100 parts by weight per 1,000,000 parts by weight of acrylonitrile or group member thereof.

6. A process according to claim 1 wherein said stabilizer is selected from 4-phenylaminodiphenylamine, N,N'-di-o-tolyl phenylenediamine, di-xylidyl-p-phenylenediamine, benzylamino diphenylamine, 4-cyclohexylaminodiphenylamine, 4-(α-methyl)-cyclohexylaminodiphenylamine, 4-methylaminodiphenylamine, 3-isopropylaminodiphenylamine, 4-(1-methyl)-propylaminodiphenylamine, 4-(1,2-dimethyl)-propylaminodiphenylamine, 4-(1-methyl)-butylaminodiphenylamine, 4-(1,3-dimethyl)-butylaminodiphenylamine, octylaminodiphenylamine or 4-isopropylamino-4'-methyl diphenylamine.

References Cited

UNITED STATES PATENTS

| | | | |
|---|---|---|---|
| 2,375,015 | 5/1945 | Marple et al. | 260—465.9 |
| 2,678,943 | 5/1954 | Taylor | 260—465.9 |
| 3,146,176 | 8/1964 | Roth et al. | 260—465.9 XR |
| 3,267,129 | 8/1966 | Roth | 260—465.3 |
| 3,267,132 | 8/1966 | Newsom | 260—465.9 |

JOSEPH P. BRUST, *Primary Examiner.*

U.S. Cl. X.R.

260—465.8, 465.9